(12) United States Patent
Ikeya

(10) Patent No.: US 10,927,759 B2
(45) Date of Patent: Feb. 23, 2021

(54) BEARING STRUCTURE FOR TURBOCHARGER AND TURBOCHARGER

(71) Applicant: IHI Corporation, Koto-ku (JP)

(72) Inventor: Nobuyuki Ikeya, Koto-ku (JP)

(73) Assignee: IHI Corporation, Koto-ku (JP)

(\*) Notice: Subject to any disclaimer, the term of this patent is extended or adjusted under 35 U.S.C. 154(b) by 141 days.

(21) Appl. No.: 16/098,955

(22) PCT Filed: Apr. 24, 2017

(86) PCT No.: PCT/JP2017/016207
§ 371 (c)(1),
(2) Date: Nov. 5, 2018

(87) PCT Pub. No.: WO2017/199695
PCT Pub. Date: Nov. 23, 2017

(65) Prior Publication Data
US 2019/0085768 A1    Mar. 21, 2019

(30) Foreign Application Priority Data

May 20, 2016 (JP) .................................. 2016-101111

(51) Int. Cl.
*F02C 7/06* (2006.01)
*F02B 39/14* (2006.01)
(Continued)

(52) U.S. Cl.
CPC .............. *F02C 7/06* (2013.01); *F01D 25/16* (2013.01); *F01D 25/18* (2013.01); *F01D 25/186* (2013.01);
(Continued)

(58) Field of Classification Search
CPC .... F02C 7/06; F02C 6/12; F02B 39/14; F16C 17/26; F16C 17/10; F16C 17/042;
(Continued)

(56) References Cited

U.S. PATENT DOCUMENTS 4,355,850 A  *  10/1982  Okano .................... F01D 25/22
                                                    384/121
4,460,284 A       7/1984  Lauterbach et al.
(Continued)

FOREIGN PATENT DOCUMENTS

CN    101258330 A    9/2008
CN    101460724 A    6/2009
(Continued)

OTHER PUBLICATIONS

International Search Report dated Jul. 18, 2017 in PCT/JP2017/016207, 2 pages.

*Primary Examiner* — David E Sosnowski
*Assistant Examiner* — Danielle M. Christensen
(74) *Attorney, Agent, or Firm* — Oblon, McClelland, Maier & Neustadt, L.L.P.

(57) ABSTRACT

Provided is a bearing structure for a turbocharger including a turbine and a compressor provided at both ends of a rotation shaft and supporting the rotation shaft to a housing, including: a first radial bearing of an oil lubrication type provided on the side of the turbine of the rotation shaft; a second radial bearing corresponding to an air bearing provided on the side of the compressor of the rotation shaft; a gas seal portion provided in the periphery of the rotation shaft between the first radial bearing and the turbine; and a thrust bearing corresponding to an air bearing provided on the side of the compressor of the rotation shaft.

4 Claims, 5 Drawing Sheets

(51) Int. Cl.
  *F16C 17/26* (2006.01)
  *F01D 25/22* (2006.01)
  *F16C 21/00* (2006.01)
  *F16C 17/10* (2006.01)
  *F16C 19/06* (2006.01)
  *F02B 39/10* (2006.01)
  *F01D 25/18* (2006.01)
  *F01D 25/16* (2006.01)
  *F02C 6/12* (2006.01)

(52) U.S. Cl.
  CPC .............. *F01D 25/22* (2013.01); *F02B 39/10* (2013.01); *F02B 39/14* (2013.01); *F02C 6/12* (2013.01); *F16C 17/10* (2013.01); *F16C 17/26* (2013.01); *F16C 19/06* (2013.01); *F16C 21/00* (2013.01); *F05D 2220/40* (2013.01); *F05D 2240/52* (2013.01); *F05D 2240/53* (2013.01); *F05D 2240/54* (2013.01); *F05D 2260/98* (2013.01); *F16C 2360/24* (2013.01)

(58) Field of Classification Search
  CPC ........ F16C 17/024; F16C 19/06; F16C 21/00; F16C 2360/24; F01D 25/22; F01D 25/186; F01D 25/16; F01D 25/18; F05D 2240/53; F05D 2240/52; F05D 2240/54; F05D 2220/40; F05D 2260/98
  See application file for complete search history.

(56) References Cited

U.S. PATENT DOCUMENTS

| | | | |
|---|---|---|---|
| 4,565,505 A | 1/1986 | Woollenweber | |
| 5,087,176 A | 2/1992 | Wieland | |
| 7,723,883 B2 * | 5/2010 | Ozaki | F01D 15/005 310/90.5 |
| 2005/0058533 A1 | 3/2005 | Belokon et al. | |
| 2007/0059188 A1 | 3/2007 | Fraser et al. | |
| 2010/0192571 A1 * | 8/2010 | Boning | F01D 25/22 60/605.3 |
| 2010/0218499 A1 | 9/2010 | Shibui et al. | |
| 2014/0169707 A1 | 6/2014 | Yoshino | |
| 2014/0186745 A1 | 7/2014 | Metz et al. | |

FOREIGN PATENT DOCUMENTS

| | | |
|---|---|---|
| CN | 101910581 A | 12/2010 |
| JP | 56-141021 A | 11/1981 |
| JP | 57-122125 A | 7/1982 |
| JP | 61-152926 A | 7/1986 |
| JP | 5-125951 A | 5/1993 |
| JP | 2000-158277 A | 6/2000 |
| JP | 2003-293781 A | 10/2003 |
| JP | 2005-163642 A | 6/2005 |
| JP | 2005-248799 A | 9/2005 |
| JP | 2007-533888 A | 11/2007 |
| JP | 2008-208732 A | 9/2008 |
| JP | 2010-200456 A | 9/2010 |
| JP | 2013-61024 A | 4/2013 |
| JP | 2014-529034 A | 10/2014 |
| JP | 2015-48812 A | 3/2015 |
| WO | WO 2009/087274 A2 | 7/2009 |

\* cited by examiner

BEARING STRUCTURE FOR TURBOCHARGER AND TURBOCHARGER

TECHNICAL FIELD

The present disclosure relates to a bearing structure for a turbocharger and a turbocharger.

BACKGROUND ART

Conventionally, as a technique relating to a bearing structure for a turbocharger, for example, a bearing protection device disclosed in Patent Literature 1 is known. This device includes a turbine impeller, a shaft, and a compressor impeller attached to the shaft. A foil bearing having a plurality of foils is provided in the periphery of the shaft and the shaft is supported inside a housing by the foil bearing. A labyrinth sealing member is provided at each of a compressor side end portion and a turbine side end portion of the shaft. The compressor side labyrinth sealing member suppresses the leakage of a gas from the compressor to a center portion. The turbine side labyrinth sealing member prevents the intrusion of combustion products or the like from the turbine to the foil bearing.

CITATION LIST

Patent Literature

Patent Literature 1: Japanese Unexamined Patent Publication No. S61-152926 A

SUMMARY OF INVENTION

Technical Problem

In this way, there is a case in which an air bearing such as a foil bearing is used in the conventional bearing structure. When the temperature of the gas flowing into the turbine is low, the air bearing hardly causes a problem. However, when the air bearing is adopted in the turbocharger allowing a high-temperature gas to flow into the turbine, there is concern that durability and reliability of the air bearing may be damaged.

The present disclosure will describe a bearing structure capable of improving durability of a bearing when a high-temperature gas flows into a turbine and a turbocharger including the bearing structure.

Solution to Problem

A bearing structure for a turbocharger according to an aspect of the present disclosure is a bearing structure for a turbocharger including a turbine and a compressor provided at both ends of a rotation shaft and supporting the rotation shaft to a housing, including: a first radial bearing of an oil lubrication type provided on the side of the turbine of the rotation shaft; a second radial bearing corresponding to an air bearing provided on the side of the compressor of the rotation shaft; a gas seal portion provided in the periphery of the rotation shaft between the first radial bearing and the turbine; and a thrust bearing corresponding to an air bearing provided on the side of the compressor of the rotation shaft.

Effects of Invention

According to an aspect of the present disclosure, it is possible to improve the durability of the bearing when a high-temperature gas flows into the turbine.

DESCRIPTION OF EMBODIMENTS

Figure 1:
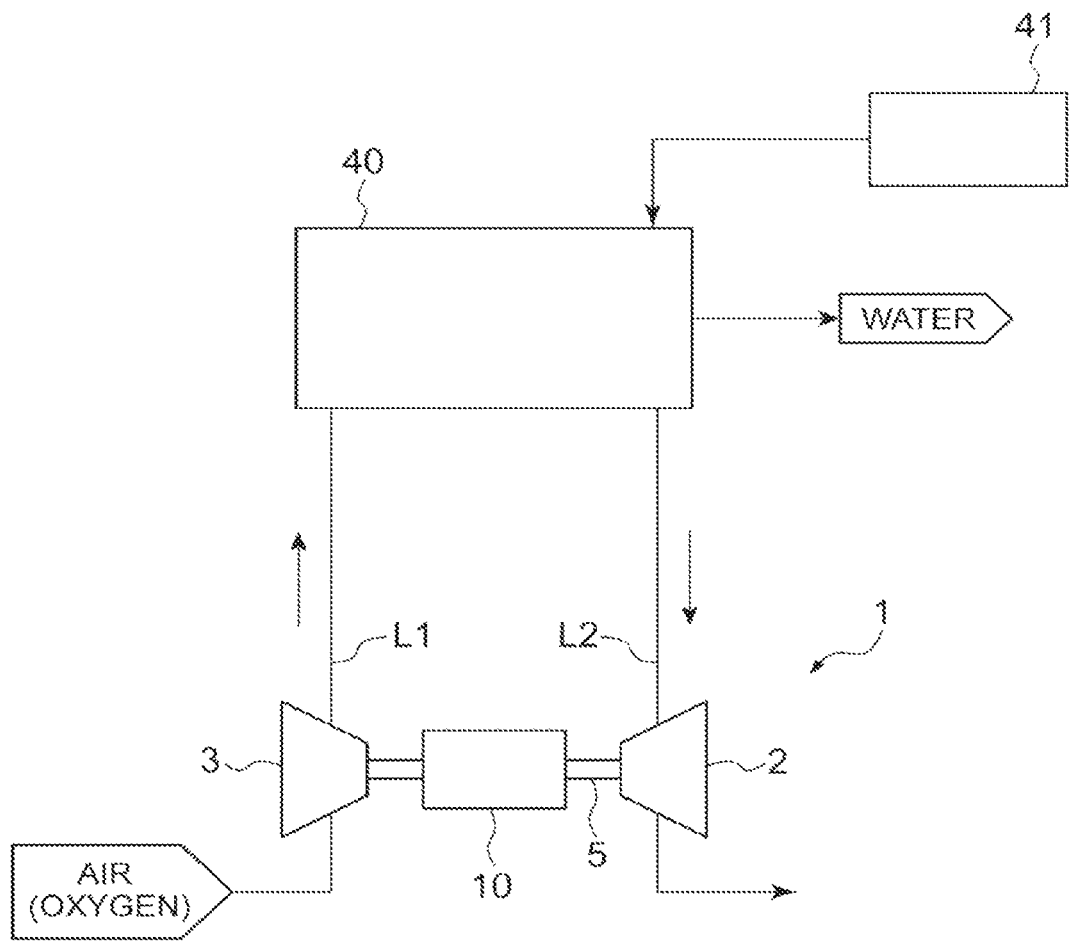
FIG. 1 is a diagram illustrating an application example of a turbocharger according to an embodiment of the present disclosure.

A bearing structure for a turbocharger according to an aspect of the present disclosure is a bearing structure for a turbocharger including a turbine and a compressor provided at both ends of a rotation shaft and supporting the rotation shaft to a housing, including: a first radial bearing of an oil lubrication type provided on the side of the turbine of the rotation shaft; a second radial bearing corresponding to an air bearing provided on the side of the compressor of the rotation shaft; a gas seal portion provided in the periphery of the rotation shaft between the first radial bearing and the turbine; and a thrust bearing corresponding to an air bearing provided on the side of the compressor of the rotation shaft.

According to the bearing structure for the turbocharger, since the first radial bearing of the oil lubrication type is provided on the side of the turbine, the first radial bearing is cooled by the lubricating oil and the rotation shaft itself is also cooled with the cooling of the first radial bearing. Thus, since the durability is not sufficient as in a case in which the conventional air bearing is used even when a high-temperature gas flows into the turbine, the durability and the reliability of the bearing can be improved. Further, since the second radial bearing which is the air bearing is provided on the side of the compressor, the inflow of oil into the compressed gas is suppressed. This is particularly effective for the application of the turbocharger in which the inflow of oil to the compressed gas is not desirable (that is, a case in which a compressed gas without oil is needed). Since both the radial bearing and the thrust bearing are formed as the air bearing on the compressor side, the inflow of oil to the compressed gas (compressor side) is further suppressed.

In some aspects, an oil movement prevention mechanism for suppressing the movement of oil from the turbine to the compressor is provided on the side of the turbine of the rotation shaft. According to this configuration, the inflow of oil to the compressed gas (compressor side) is further suppressed.

In some aspects, the oil movement prevention mechanism includes a step portion protruding in a radial direction in relation to a portion provided with the first radial bearing in the rotation shaft and facing the first radial bearing. According to the configuration including the step portion, oil is scattered from the step portion outward in the radial direction in accordance with the rotation of the rotation shaft. Thus, the inflow of oil to the compressed gas (compressor side) is further suppressed.

In some aspects, the oil movement prevention mechanism includes a flange portion protruding in a radial direction in relation to a portion provided with the first radial bearing in the rotation shaft and facing the first radial bearing. According to the configuration including the flange portion, oil is scattered from the flange portion outward in the radial direction in accordance with the rotation of the rotation shaft. Thus, the inflow of oil to the compressed gas (compressor side) is further suppressed.

A turbocharger according to an aspect of the present disclosure includes a turbine, a compressor, a housing accommodating a rotation shaft, and any one of the above-described bearing structures supporting a rotation shaft to the housing. According to the turbocharger with the bearing structure, it is possible to improve the durability and the reliability of the bearing when a high-temperature gas flows into the turbine. Further, since the second radial bearing corresponding to the air bearing is provided on the side of the compressor as described above, the inflow of oil into the compressed gas is suppressed.

In some aspects, the turbocharger is formed so that a pressure on the side of the compressor is higher than a pressure on the side of the turbine. According to this configuration, since the flow of the gas directed from the compressor to the turbine is made inside the housing, oil is difficult to move toward the compressor and thus a compressed gas without oil can be generated in the turbocharger. Since the flow of the gas cools the rotation shaft, this is effective from the viewpoint of the durability of the first radial bearing.

Hereinafter, an embodiment of the present disclosure will be described with reference to the drawings. Additionally, in the description of the drawings, the same reference numerals will be given to the same components and a repetitive description thereof will be omitted.

A bearing structure X of the embodiment is applied to, for example, an electric turbocharger 1. First, an application example of the electric turbocharger 1 will be described with reference to FIG. 1. The electric turbocharger 1 is applied to, for example, a fuel cell system 40. The type of the fuel cell system 40 is not particularly limited. The fuel cell system 40 may be, for example, a polymer electrolyte fuel cell (PEFC). The fuel cell system 40 may be a fuel cell other than a PEFC such as a phosphoric acid fuel cell (PAFC). Hydrogen which is fuel is supplied from a hydrogen source 41 to the fuel cell system 40. Meanwhile, air (oxygen) which is an oxidizing agent is supplied to the fuel cell system 40 through an air supply line L1. In the fuel cell system 40, electric power is generated by a chemical reaction between the fuel and the oxidizing agent. Air including water vapor is discharged from the fuel cell system 40 through an exhaust gas line L2. Meanwhile, water is discharged from the fuel cell system 40.

The electric turbocharger 1 is connected to the fuel cell system 40. More specifically, the electric turbocharger 1 includes a turbine 2, a compressor 3, and a rotation shaft 5 having the turbine 2 and the compressor 3 provided at both ends thereof. A motor 10 for applying rotational driving power to the rotation shaft 5 is provided at the rotation shaft 5 between the turbine 2 and the compressor 3. The exhaust gas line L2 is connected to the turbine 2 and the air supply line L1 is connected to the compressor 3. The electric turbocharger 1 rotates a turbine wheel 8 (see FIG. 2) of the turbine 2 by using high-temperature air discharged from the fuel cell system 40. When the turbine wheel 8 rotates, a compressor wheel 9 of the compressor 3 rotates and compressed air is supplied to the fuel cell system 40 through the air supply line L1.

A temperature of air which is an exhaust gas of the fuel cell system 40 may be, for example, an arbitrary temperature to about 700° C. The electric turbocharger 1 includes a bearing structure X to be described later and is particularly suitable for the case of using a high-temperature gas. As in the fuel cell system 40, the electric turbocharger 1 is particularly suitable for a case in which an oil element included in compressed air (compressed gas) generated by the compressor 3 is not desirable (that is, a mixture of an oil element is not desirable). In other words, the electric turbocharger 1 is a turbine 2 for treating a high-temperature gas and an electric turbocharger requiring air without oil.

The fuel cell system 40 and the electric turbocharger 1 can be mounted on, for example, a vehicle (an electric automobile). Additionally, electric power generated by the fuel cell system 40 may be supplied to the motor 10 of the electric turbocharger 1, but electric power may be supplied thereto from a source other than the fuel cell system 40.

Figure 2:
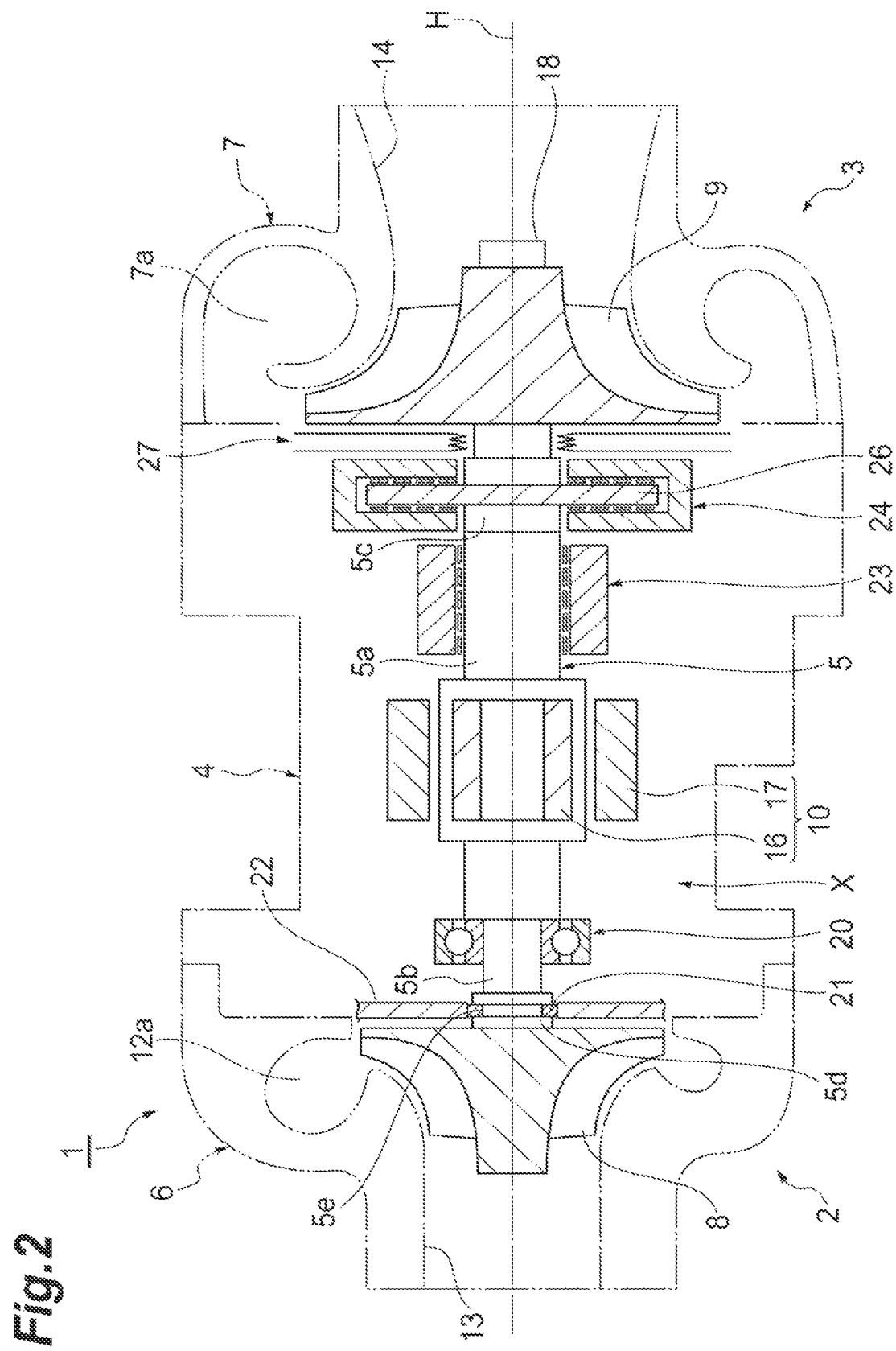
FIG. 2 is a cross-sectional view illustrating the turbocharger of FIG. 1.

Next, the electric turbocharger 1 will be described in more detail with reference to FIG. 2. In FIG. 2, a portion of the housing is indicated by an imaginary line. The electric turbocharger 1 includes the turbine 2, the compressor 3, and the motor 10. The motor 10 applies rotational driving power to the rotation shaft 5 connected to the compressor wheel 9 of the compressor 3.

The turbine 2 includes a turbine housing 6 and a turbine wheel 8 accommodated in the turbine housing 6. The compressor 3 includes a compressor housing 7 and a compressor wheel 9 accommodated in the compressor housing 7.

The turbine wheel 8 is provided at one end of the rotation shaft 5 and the compressor wheel 9 is provided at the other end of the rotation shaft 5. The turbine wheel 8 is provided at one end of the rotation shaft 5 and the compressor wheel 9 is fixed to the other end of the rotation shaft 5 by a shaft end nut 18. The motor 10 is provided between the turbine wheel 8 and the compressor wheel 9 in the direction of the axis H of the rotation shaft 5.

A bearing housing 4 is provided between the turbine housing 6 and the compressor housing 7. The rotation shaft 5 is rotatably supported by the bearing housing 4 through the bearing structure X.

The turbine housing 6 is provided with an exhaust gas inlet (not illustrated) and an exhaust gas outlet 13. Air including water vapor discharged from the fuel cell system 40 flows into the turbine housing 6 through the exhaust gas inlet connected to the exhaust gas line L2. The inflowing air passes through a turbine scroll passage 12a and is supplied to the inlet side of the turbine wheel 8. The turbine wheel 8 is, for example, a radial turbine and generates rotational power by using the pressure of the supplied air. Then, the air flows to the outside of the turbine housing 6 through the exhaust gas outlet 13.

The compressor housing 7 is provided with a suction port 14 and a discharge port (not illustrated). When the turbine wheel 8 rotates as described above, the rotation shaft 5 and the compressor wheel 9 rotate. The rotating compressor wheel 9 is, for example, a radial compressor and is used to suck and compress external air through the suction port 14. The air which is compressed by the compressor wheel 9 passes through a compressor scroll passage 7a and is discharged from the discharge port. The compressed air which is discharged from the discharge port is supplied to the fuel cell system 40 through the air supply line L1 connected to the discharge port.

The motor 10 is, for example, a brushless AC motor and includes a motor rotor 16 which is a rotor and a motor stator 17 which is a stator. The motor rotor 16 includes one or a plurality of magnets. The motor rotor 16 is fixed to the rotation shaft 5 and is rotatable about the axis along with the rotation shaft 5. The motor rotor 16 is disposed at a center portion 5a in the direction of the axis H of the rotation shaft 5. The motor stator 17 includes a plurality of coils and iron cores. The motor stator 17 is disposed to surround the motor rotor 16 in the circumferential direction of the rotation shaft 5. The motor stator 17 is accommodated in the bearing housing 4. The motor stator 17 causes a magnetic field around the rotation shaft 5 and rotates the motor rotor 16 in corporation with the motor rotor 16.

The rotation range of the rotation shaft 5 in the motor 10 may be an arbitrary rotation number up to 200,000 rpm. The motor 10 may be able to perform both a rotational driving operation during acceleration and a regenerative operation during deceleration. In the electric turbocharger 1, since the rotational driving power is obtained by using the high-temperature air, the power which is generated by the turbine 2, for example, at the maximum output may be larger than the power generated by the motor 10. That is, the high output of the turbine 2 is obtained by using the high-temperature gas. In addition, in the case of the partial load or a case in which the air temperature at the exhaust gas inlet of the turbine 2 is low, the power which is generated by the turbine 2 can be smaller than the power generated by the motor 10.

A first radial bearing 20 and a gas seal portion 21 are provided at an end portion 5b of the rotation shaft 5 on the side of the turbine 2. The first radial bearing 20 is provided inside the bearing housing 4 and supports the rotation shaft 5 in the radial direction. The first radial bearing 20 is a ball bearing of an oil lubrication type. The first radial bearing 20 may be any bearing as long as the oil lubrication type is used. The type of the bearing of the first radial bearing 20 is not particularly limited. The first radial bearing 20 may be a rolling bearing or a sliding bearing. Additionally, the "oil lubrication type" includes the lubrication by the lubricating oil and the lubrication by the grease. By adopting the first radial bearing 20 of the oil lubrication type, the durability and the reliability for the high-temperature gas flowing into the turbine 2 are also ensured.

The gas seal portion 21 is a piston ring type seal portion provided in the periphery of the rotation shaft 5. A ring-shaped seal groove 5e is formed in a boss portion 5d provided between the end portion 5b and the turbine wheel 8. A disc-shaped seal plate 22 is provided to surround the seal groove 5e. The gas seal portion 21 is provided between the inner peripheral surface of the seal plate 22 and the seal groove 5e of the boss portion 5d. The gas seal portion 21 is disposed on the seal groove 5e.

The first radial bearing 20 is provided between the turbine wheel 8 and the motor rotor 16. The gas seal portion 21 is provided between the turbine wheel 8 and the first radial bearing 20.

Meanwhile, a thrust bearing 24 and a labyrinth seal 27 are provided at an end portion 5c of the rotation shaft 5 on the side of the compressor 3. The thrust bearing 24 is provided inside the bearing housing 4 and supports the rotation shaft 5 in the direction of the axis H. The thrust bearing 24 is an air bearing. The thrust bearing 24 is, for example, a foil bearing. The thrust bearing 24 may be an air bearing other than the foil bearing. The thrust bearing 24 supports the rotation shaft 5 through a disc-shaped thrust collar 26 fixed to an end portion 5c of the rotation shaft 5.

The thrust bearing 24 is provided between the compressor wheel 9 and the motor rotor 16. The labyrinth seal 27 is provided between the compressor wheel 9 and the thrust bearing 24.

A second radial bearing 23 is provided at the rotation shaft 5 between the thrust bearing 24 and the motor rotor 16, that is, on the side of the compressor 3 of the center portion 5a. The second radial bearing 23 is provided inside the bearing housing 4 and supports the rotation shaft 5 in the radial direction. The second radial bearing 23 is an air bearing. The second radial bearing 23 is, for example, a foil bearing. The second radial bearing 23 may be any bearing as long as the air bearing is used.

In this way, in the electric turbocharger 1, the first radial bearing 20 of the oil lubrication type is provided on the side of the turbine 2 of the center portion 5a and the second radial bearing 23 and the thrust bearing 24 which are air bearings are provided on the side of the compressor 3 of the center portion 5a.

The bearing structure X of the embodiment includes the first radial bearing 20, the gas seal portion 21, the seal plate 22, the second radial bearing 23, the thrust collar 26, the thrust bearing 24, and the labyrinth seal 27.

Figure 3:
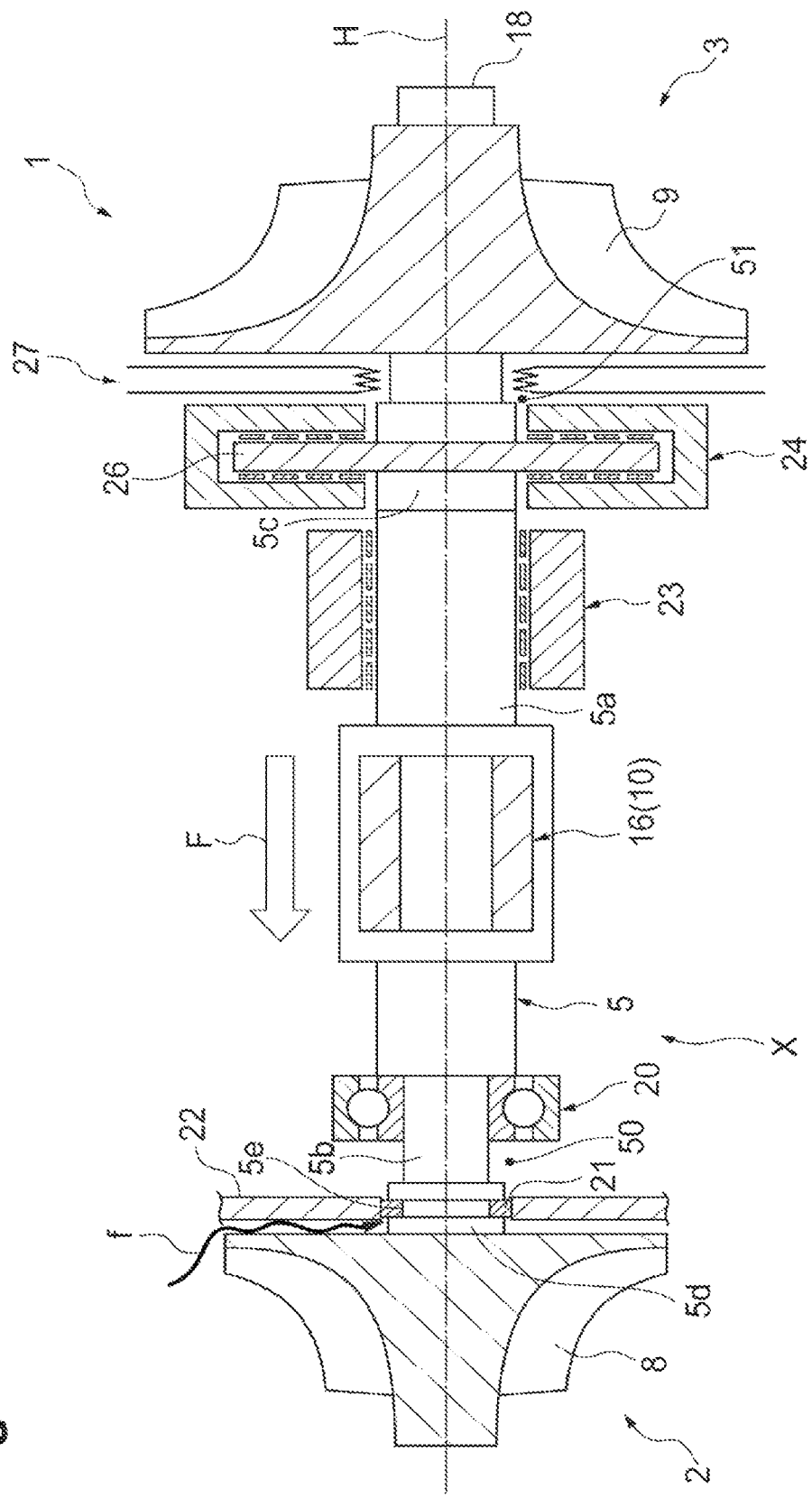
FIG. 3 is a cross-sectional view illustrating a flow of a gas in the turbocharger of FIG. 2.

In the electric turbocharger 1, a pressure on the side of the compressor 3 is set to be higher than a pressure on the side of the turbine 2. Specifically, as illustrated in FIG. 3, a region 50 at the inside of the gas seal portion 21 on the rear surface side of the turbine 2 forms a low-pressure chamber and a region 51 at the inside of the labyrinth seal 27 on the side of the rear surface of the compressor 3 forms a high-pressure chamber. The gas seal portion 21 is provided on the side of the turbine 2 and a pressure of the region 51 on the inside of the labyrinth seal 27 becomes higher than that of the region 50 on the inside of the gas seal portion 21. At a position on the side of the turbine 2, a substantially atmospheric level is maintained in order to collect the lubricating oil of the first radial bearing 20. For example, the lubricating oil of the first radial bearing 20 flows in a lubricating oil discharge space provided inside the bearing housing 4 and is discharged from the outlet to the outside of the electric turbocharger 1. Meanwhile, since the compressed air is generated on the side of the compressor 3, a pressure higher than an atmospheric pressure is maintained. Due to this pressure difference, the leakage of the oil element from the labyrinth seal 27 to the compressor 3 is prevented. Additionally, the turbine 2 may be set to a low pressure side and the compressor 3 may be set to a high pressure side by the addition of another mechanism. For example, the compressed air (cooling air) can be supplied from the outside of the electric turbocharger 1 (the fuel cell system side) to the region 51 on the side of the compressor 3.

According to the above-described bearing structure X of the electric turbocharger 1, since the first radial bearing 20 of the oil lubrication type is provided on the side of the turbine 2, the first radial bearing 20 is cooled by the lubricating oil and the rotation shaft 5 itself is cooled in accordance with the cooling of the first radial bearing 20. That is, an increase in temperature of the rotation shaft 5 is prevented. Thus, even when the high-temperature air flows into the turbine 2, the durability is not insufficient as in a case in which the air bearing is used in the conventional turbine 2. Accordingly, the durability and the reliability of the bearing can be improved. Further, since the second radial bearing 23 which is the air bearing is provided on the side of the compressor 3, the inflow of oil into the compressed gas is suppressed. This is particularly effective for the application of the turbocharger in which the inflow of oil to the compressed gas is not desirable (that is, a case in which the compressed gas without oil is needed). For example, since the fuel cell system 40 needs the compressed gas without oil, the electric turbocharger 1 and the bearing structure X are particularly effective in a case in which the electric turbocharger 1 is applied to the fuel cell system 40. Further, since the gas seal portion 21 is provided between the first radial bearing 20 and the turbine 2, the leakage of oil to the compressor 3 is suppressed. As illustrated in FIG. 3, since the gas seal portion 21 regulates the flow f of air advancing toward the motor 10 while passing through the rear surface side of the turbine wheel 8, the movement of oil in that direction is regulated.

Figure 5:
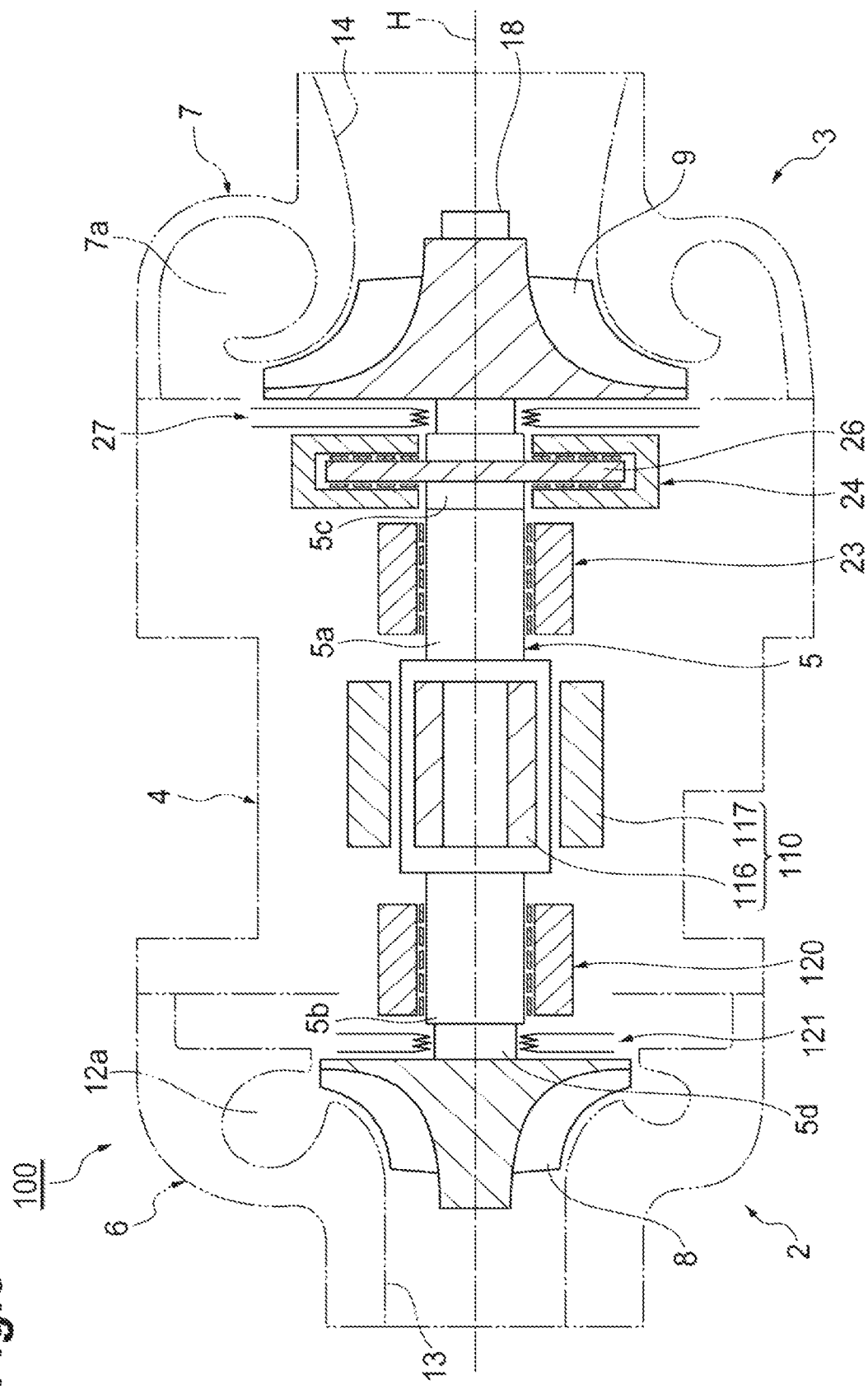
FIG. 5 is a cross-sectional view illustrating a conventional turbocharger.

In a conventional electric turbocharger 100 illustrated in FIG. 5, the rotation shaft 5 was provided with a motor 110 including a motor rotor 116 and a motor stator 117 and a first radial bearing 120 and a gas seal portion 121 were provided between the motor 110 and the turbine wheel 8. As the first radial bearing 120, an air bearing was adopted. The air bearing is weak to heat. When the first radial bearing 120 is the air bearing in a case in which high-temperature air flows into the turbine 2, there is concern that the durability and the reliability of the bearing may be damaged. Regarding this point, in the bearing structure X and the electric turbocharger 1 of the embodiment illustrated in FIGS. 2 and 3, a configuration capable of enduring a high temperature is provided on the side of the turbine 2 and hence the durability and the reliability of the bearing are improved.

Further, the thrust bearing 24 is provided on the side of the compressor 3 in the rotation shaft 5. Accordingly, since both the second radial bearing 23 and the thrust bearing 24 on the side of the compressor 3 are air bearings, the inflow of oil to the compressed air is further suppressed.

According to the electric turbocharger 1 with the bearing structure X, the durability and the reliability of the bearing can be improved when the high-temperature gas flows into the turbine 2. Further, since the second radial bearing 23 corresponding to the air bearing is provided on the side of the compressor 3 as described above, the inflow of oil to the compressed air is suppressed.

Further, since the electric turbocharger 1 is formed so that a pressure on the side of the compressor 3 is higher than a pressure on the side of the turbine 2, the flow F of air directed from the compressor 3 to the turbine 2 is made inside the bearing housing 4 as illustrated in FIG. 3. The lubricating oil is difficult to move toward the compressor 3. As a result, it is possible to generate the compressed air without oil in the electric turbocharger 1. Further, since the flow of the cooling air cools the rotation shaft 5, it is effective from the viewpoint of the durability of the first radial bearing 20.

Figure 4A:
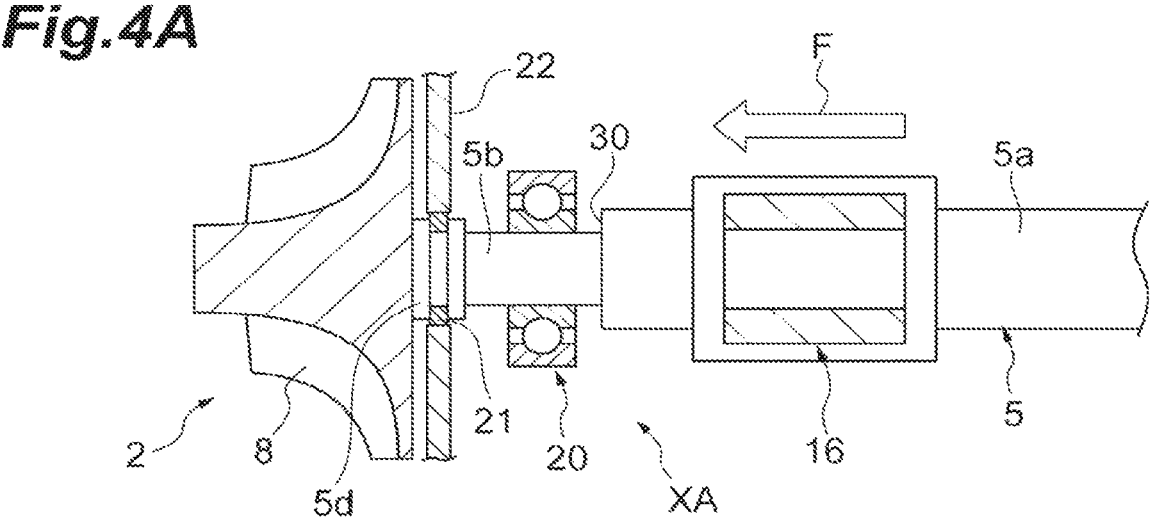
FIG. 4A is a cross-sectional view illustrating a bearing structure for a turbocharger according to a first modified example.

Various modified examples can be obtained other than the above-described embodiment. For example, as illustrated in FIG. 4A, a step portion 30 may be provided between the center portion 5a and the end portion 5b of the rotation shaft 5. The step portion 30 is an oil movement prevention mechanism which is provided on the side of the turbine 2 and suppresses the movement of the lubricating oil from the turbine 2 to the compressor 3. The step portion 30 includes, for example, a ring-shaped surface perpendicular to the axis H. The step portion 30 protrudes (projects) in the radial direction in relation to the end portion 5b provided with the first radial bearing 20 in the rotation shaft 5. The step portion 30 is separated from the side surface of the first radial bearing 20 in the direction of the axis H and faces the side surface. According to the bearing structure XA with the step portion 30, the lubricating oil is scattered from the step portion 30 outward in the radial direction in accordance with the rotation of the rotation shaft 5. In this way, the inflow of oil to the compressed air generated by the compressor 3 is further suppressed by actively using the centrifugal force.

Figure 4B:
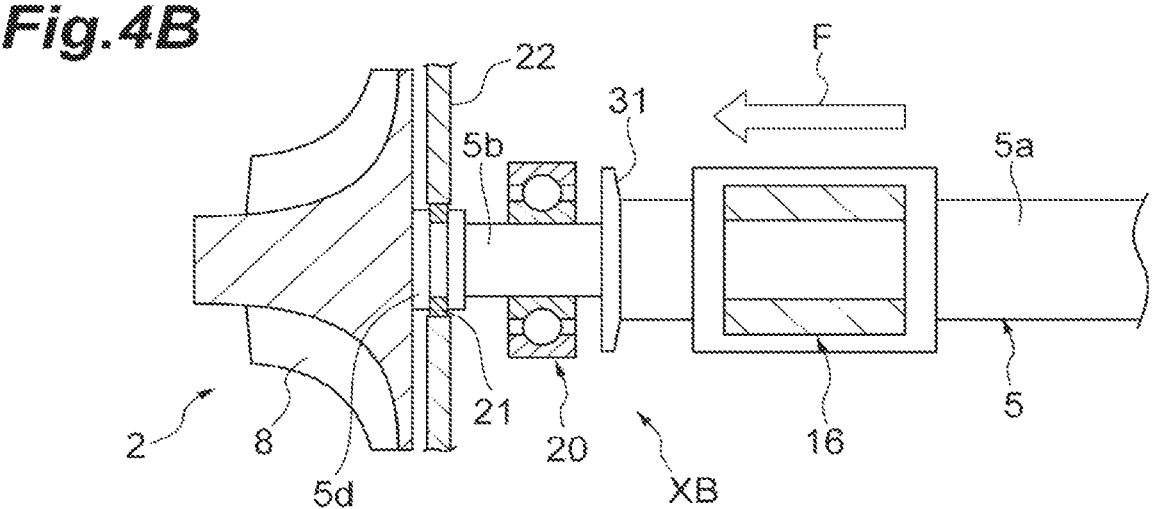
FIG. 4B is a cross-sectional view illustrating a bearing structure for a turbocharger according to a second modified example.

Further, as illustrated in FIG. 4B, a flange portion 31 is provided between the center portion 5a and the end portion 5b of the rotation shaft 5. The flange portion 31 is an oil movement prevention mechanism which is provided on the side of the turbine 2 and suppresses the movement of the lubricating oil from the turbine 2 to the compressor 3. The flange portion 31 includes, for example, a ring-shaped surface perpendicular to the axis H. The flange portion 31 protrudes (projects) in the radial direction in relation to the end portion 5b provided with the first radial bearing 20 in the rotation shaft 5. The flange portion 31 is separated from the side surface of the first radial bearing 20 in the direction of the axis H and faces the side surface. According to the bearing structure XB with the flange portion 31, the lubricating oil is scattered from the step portion 30 outward in the radial direction in accordance with the rotation of the rotation shaft 5. In this way, the inflow of oil to the compressed air generated by the compressor 3 is further suppressed by actively using the centrifugal force. The flange portion 31 may be provided on the step portion 30.

Figure 4C:
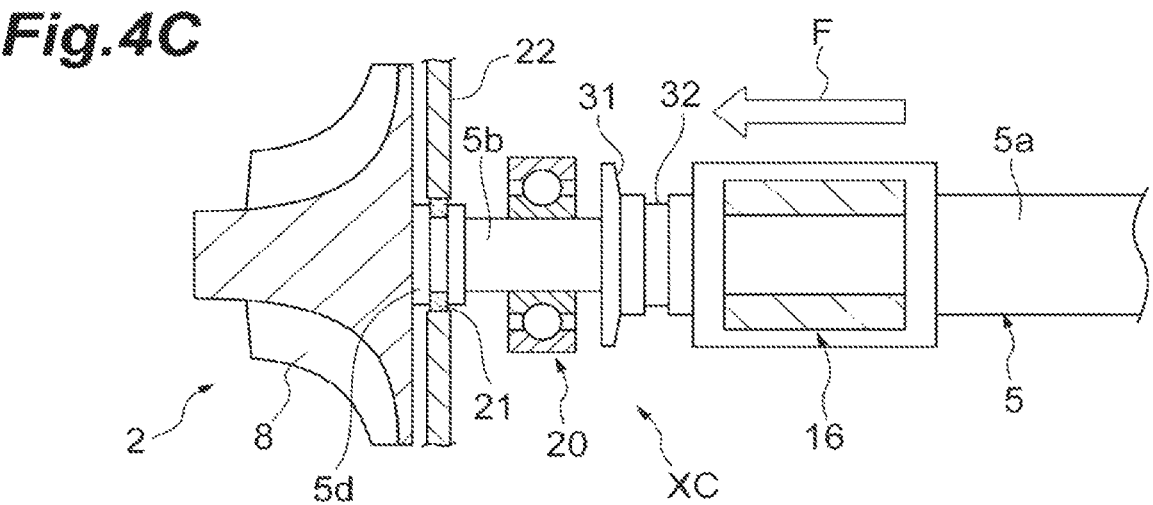
FIG. 4C is a cross-sectional view illustrating a bearing structure for a turbocharger according to a third modified example.

Further, as illustrated in FIG. 4C, a groove portion 32 may be provided between the flange portion 31 and the center portion 5a of the rotation shaft 5 in addition to the flange portion 31. The groove portion 32 may be a ring-shaped groove formed in the outer peripheral portion of the rotation shaft 5. The groove portion 32 is an oil movement prevention mechanism which is provided on the side of the turbine 2 and suppresses the movement of the lubricating oil from the turbine 2 to the compressor 3. The groove portion 32 can guide the lubricating oil to the outlet of the lubricating oil discharge space. According to the bearing structure XC including the flange portion 31 and the groove portion 32, the inflow of oil to the compressed air generated by the compressor 3 is further suppressed by the centrifugal force.

While the embodiment of the present disclosure has been described, the present disclosure is not limited to the above-described embodiment. For example, the oil lubrication type thrust bearing may be provided on the side of the turbine 2 of the rotation shaft 5. In this case, since the thrust bearing is of the oil lubrication type, the thrust bearing can be decreased in size. Thus, a low inertia characteristic is realized and an advantageous configuration for the rotation of the rotation shaft 5 is obtained.

Further, the piston ring type gas seal portion 21 which is provided on the side of the turbine 2 is, for example, a seal ring or the like and may be of an arbitrary type. In addition, a mechanical seal may be provided on the side of the turbine 2 instead of the piston ring type gas seal portion 21.

Further, the turbine wheel 8 and the compressor wheel 9 of the axial flow type or mixed flow type may be provided instead of the turbine wheel 8 and the compressor wheel 9 of the radial type.

The bearing structure of the present disclosure is not limited to the application to the electric turbocharger. The bearing structure may be also applied to a turbocharger without a motor. That is, the present disclosure may be applied to any turbocharger as long as the turbocharger includes the turbine, the compressor, and the rotation shaft. The present disclosure is not limited to the fuel cell turbocharger. The bearing structure of the present disclosure exhibits a particularly advantageous effect in the case of the application to the turbocharger requiring the compressed air (compressed gas) without oil.

INDUSTRIAL APPLICABILITY

According to some aspects of the present disclosure, it is possible to improve the durability of the bearing when a high-temperature gas flows into the turbine.

REFERENCE SIGNS LIST

1: electric turbocharger (turbocharger), 2: turbine, 3: compressor, 4: bearing housing (housing), 5: rotation shaft, 6: turbine housing, 7: compressor housing, 8: turbine wheel, 9: compressor wheel, 10: motor, 16: motor rotor, 17: motor stator, 20: first radial bearing, 21: gas seal portion, 23: second radial bearing, 24: thrust bearing, 27: labyrinth seal, 30: step portion, 31: flange portion, 32: groove portion, H: axis, X, XA, XB, XC: bearing structure.

The invention claimed is:

1. A turbocharger, comprising:
a rotation shaft;
a turbine and a compressor provided at respective ends of the rotation shaft;
a housing accommodating the rotation shaft; and
a bearing structure including a first radial bearing of an oil lubrication type provided on the side of the turbine of the rotation shaft;
a second radial bearing corresponding to an air bearing provided on the side of the compressor of the rotation shaft;
a gas seal portion provided in the periphery of the rotation shaft between the first radial bearing and the turbine; and
a thrust bearing corresponding to an air bearing provided on the side of the compressor of the rotation shaft,
wherein a pressure on the side of the compressor is higher than a pressure on the side of the turbine.

2. The turbocharger according to claim 1,
wherein an oil movement prevention mechanism to suppress the movement of oil from the turbine to the compressor is provided on the side of the turbine of the rotation shaft.

3. The turbocharger according to claim 2,
wherein the oil movement prevention mechanism includes a step portion protruding in a radial direction in relation to a portion provided with the first radial bearing in the rotation shaft and facing the first radial bearing.

4. The turbocharger according to claim 2,
wherein the oil movement prevention mechanism includes a flange portion protruding in a radial direction in relation to a portion provided with the first radial bearing in the rotation shaft and facing the first radial bearing.

* * * * *